(12) United States Patent
Shimizu et al.

(10) Patent No.: US 7,182,671 B1
(45) Date of Patent: Feb. 27, 2007

(54) BLASTING APPARATUS AND BLASTING METHOD

(75) Inventors: Tokuo Shimizu, Tokyo (JP); Tetsunori Yano, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 0 days.

(21) Appl. No.: 11/463,197

(22) Filed: Aug. 8, 2006

(30) Foreign Application Priority Data

Aug. 17, 2005 (JP) .............................. 2005-236653

(51) Int. Cl.
*B24C 1/00* (2006.01)
*B24C 3/06* (2006.01)

(52) U.S. Cl. .............................. 451/8; 451/38; 451/87; 451/92

(58) Field of Classification Search .................... 451/5, 451/8, 9, 10, 38, 87, 92
See application file for complete search history.

(56) References Cited

U.S. PATENT DOCUMENTS

| | | | | |
|---|---|---|---|---|
| 3,908,314 | A * | 9/1975 | Watanabe et al. | 451/92 |
| 4,139,970 | A * | 2/1979 | Hockett | 451/90 |
| 4,286,417 | A * | 9/1981 | Shelton | 451/2 |
| 4,545,156 | A * | 10/1985 | Hockett | 451/2 |
| 4,614,100 | A * | 9/1986 | Green et al. | 72/53 |
| 4,993,200 | A * | 2/1991 | Morioka et al. | 451/88 |
| 5,138,800 | A * | 8/1992 | Janusz | 451/5 |
| 5,502,868 | A | 4/1996 | Bräendle | |
| 5,613,895 | A * | 3/1997 | Baker | 451/2 |
| 5,938,509 | A * | 8/1999 | Fox et al. | 451/91 |
| 6,244,940 | B1 * | 6/2001 | Boulton et al. | 451/95 |
| 6,447,366 | B1 * | 9/2002 | Ebadian et al. | 451/2 |
| 6,508,413 | B2 * | 1/2003 | Bauer et al. | 239/227 |
| 6,675,548 | B2 | 1/2004 | Bristol et al. | |
| 6,797,411 | B2 * | 9/2004 | Sodani et al. | 428/659 |
| 2002/0098776 | A1 * | 7/2002 | Dopper | 451/2 |
| 2003/0012978 | A1 | 1/2003 | Sodani et al. | |

FOREIGN PATENT DOCUMENTS

| | | |
|---|---|---|
| EP | 0642888 A1 | 3/1995 |
| JP | 9-109029 | 4/1997 |

\* cited by examiner

*Primary Examiner*—M. Rachuba
(74) *Attorney, Agent, or Firm*—David S. Safran

(57) ABSTRACT

The present invention provides a lasting apparatus which is provided with an ejection device, which ejects blast media, and a recovery device, which sucks and recovers ejected and used blast media, on a traveling carriage, ejects the blast media to a surface to be treated by the ejection device while causing the traveling carriage to travel on the surface to be treated, and recovers the used blast media by the recovery device, and comprising: roughness measuring device that is provided at the traveling carriage and measures roughness of an uneven surface of the surface to be treated which is treated by ejection of the blast media; and control unit which performs a feedback control of an ejection amount of the blast media, ejection pressure, ejection speed, an ejection air amount, a suction air amount by the recovery device, and a speed of the traveling carriage so that the roughness which is measured by the roughness measuring device is within a range of predetermined roughness.

8 Claims, 5 Drawing Sheets

BLASTING APPARATUS AND BLASTING METHOD

BACKGROUND OF THE INVENTION

1. Field of the Invention

The present invention relates to a blasting apparatus and a blasting method for ejecting blasting media to a surface to be treated and roughening the surface to be treated to perform surface preparation.

2. Description of the Related Art

In the suppression chamber of an atomic power plant facility, the frame is made of concrete, and a pool is constructed by pasting steel plates on its inner wall surface and bottom surface. The outer surface of the steel plates, namely the inner surface of the suppression chamber is coated by recoating it with a plurality of coating materials excellent in corrosion resistance, decontaminability and the like. The repainting construction is carried out with about 10 years after the start of operation as a guide, and as a pre-construction of the repainting construction, a blasting operation of grinding the coating film including radioactive substances on the inner surface and roughening the coated surface to perform surface preparation is performed.

The blasting operation is performed by a sand blasting technique as described in Japanese Patent Application Laid-Open No. 9-109029. The sand blasting technique is a technique of causing a blast material such as sand ejected from a nozzle by high speed air to collide against a coated surface and grinding the coating film on the coated surface with the impact force to roughen the surface.

However, in the sand blasting technique, the blast material rebounds with a strong force, and therefore, there is the problem of scattering of dust particles. There is also the disadvantage that a worker who operates a nozzle has to be heavily equipped to protect his or her body from the blast material that rebounds with a strong force, which impairs workability. Further, it is difficult for the worker to perform the operation with uniform quality because he or she has a poor view due to scattering dust particles.

Thus, in order to solve such problems, the applicant of the present application proposes a technique of using a blast medium in a sponge piece form with abrasives contained in a porous elastic body, namely, a sponge blasting technique.

According to the sponge blasting technique, when a sponge blast medium ejected from a nozzle with high speed air collides against a coated surface, the blast medium becomes flat, and the contained abrasives directly collide against the coated surface at a high speed. Thereby, the coating film can be ground and removed as in the sand blasting technique. Dust particles which usually float in the air are taken into the sponge pieces and directly drop, and therefore, there is the advantage of being capable of reducing scattering of dust particles. Further, since the repulsive force is also absorbed by the sponge pieces, rebound is drastically reduced, and thereby, there is provided the advantage that the worker who operates the nozzle can be lightly equipped.

Incidentally, roughness of the roughened coated surface of the suppression chamber is specified in accordance with the coating material to be coated. Therefore, a worker selects the abrasive of the material corresponding to the roughness, and the worker treats the coated surface to desired roughness as the worker manually repeats the blasting operation and roughness measurement.

SUMMARY OF THE INVENTION

However, the above described conventional blasting operation of the suppression chamber is the operation of manually performing the blasting operation and roughness measurement, which depends on the intuition of a worker, and therefore, there is the demand for standardization and automation of the blasting operation.

The present invention is made in view of the above circumstances, and has its object to provide a blasting apparatus and a blasting method capable of achieving standardization and automation in a blasting operation of a surface to be treated of which roughness is specified.

In order to attain the above-described object, the invention according to a first aspect of the present invention is a blasting apparatus which is provided with an ejection device, which ejects blast media, and a recovery device, which sucks and recovers ejected and used blast media, on a traveling carriage, ejects the blast media to a surface to be treated by the ejection device while causing the traveling carriage to travel on the surface to be treated, and recovers the used blast media by the recovery device, and is characterized by including a roughness measuring device that is provided at the traveling carriage and measures roughness of an uneven surface of the surface to be treated which is treated by ejection of the blast media, and a control unit which performs a feedback control of an ejection amount of the blast media, ejection pressure, ejection speed, an ejection air amount, a suction air amount by the recovery device, and a speed of the traveling carriage so that the roughness which is measured by the roughness measuring device is within a range of predetermined roughness.

To attain the above described object, the invention according to a fourth aspect of the present invention is, in a blasting method in which an ejection device which ejects blast media, and a recovery device which sucks and recovers ejected and used blast media are provided on a traveling carriage, the blast media is ejected to a surface to be treated by the ejection device while causing the traveling carriage to travel on the surface to be treated, and the used blast media are recovered by the recovery device, characterized by including the steps of measuring roughness of an uneven surface of the surface to be treated which is treated by ejection of the blast media, and performing a feedback control of an ejection amount of the blast media, ejection pressure, ejection speed, an ejection air amount, a suction air amount by the recovery device, and a speed of the traveling carriage so that the roughness which is measured is within a range of predetermined roughness.

According to the invention described in the first and fourth aspects, the ejection device of the blast media, the recovery device of the blast media, and the roughness measuring device are mounted on the traveling carriage which travels and moves on the surface to be treated. Then, the traveling carriage is caused to automatically travel, and while the blast media are ejected to the surface to be treated from the ejection device, and the used blast media are sucked and recovered by the recovery device, the roughness (the arithmetic average roughness, the maximum height, the ten point height of irregularities) of the uneven surface of the surface to be treated which is treated by ejection of the blast media is measured by the roughness measuring device. Then, the feedback control of the ejection amount of the blast media, the ejection pressure, the ejection speed, the ejection air amount, the suction air amount by the above described recovery device, and the speed of the above described traveling carriage is performed so that the measured roughness is within the range of predetermined roughness. Thereby, standardization and automation can be achieved in the blast operation of the surface to be treated of which roughness is specified.

If the various conditions to achieve the predetermined roughness obtained by the above described feedback control are stored in the storage part of the control unit, and are read at the next time of using the same conditions, the surface to be treated can be treated to have the predetermined roughness from the beginning without performing a feedback control at the next time.

In the first aspect, the invention described in a second aspect is characterized by further including an image pickup device which is provided at the traveling carriage and picks up an image of the surface to be treated which is treated by ejection of the blast media, and in that the control unit compares an image obtained by the image pickup device and a reference image which is previously stored, and determines a rust removal degree of the surface to be treated and/or an anchor pattern.

In the fourth aspect, the invention described in a fifth aspect is characterized by further including the steps of picking up an image of the surface to be treated which is treated by ejection of the blast media, comparing the image with the reference image, and determining the rust removal degree of the surface to be treated and/or an anchor pattern.

According to the invention described in the second and fifth aspects, the image pickup device is provided at the traveling carriage, the image of the surface to be treated after blasting is picked up by the image pickup device, and the control unit compares the image obtained by the image pickup device and the reference image. (sample image) previously stored, and determines the rust removal degree of the surface to be treated specified by ISO and/or the anchor pattern. Therefore, according to the present invention, the blasting operation of the surface to be treated and the rust removal degree determining operation and/or the anchor pattern determining operation can be simultaneously carried out.

In the first or the second aspect, the invention described in a third aspect is characterized in that the blast medium is a blast medium in which abrasives are contained in a porous elastic body.

In the fourth or the fifth aspect, the invention described in a sixth aspect is characterized in that the blast medium is a blast medium in which abrasives are contained in a porous elastic body.

The invention described in the third and sixth aspects is characterized in that the blast medium is a blast medium in which abrasives are contained in a porous elastic body.

The invention described in the third and sixth aspects is characterized by adopting a blasting technique which uses the blast media in which abrasives are contained in porous elastic bodies as the blast media. The blast media used in the blasting technique is what is made by containing abrasives of different materials in accordance with use purpose in porous elastic bodies such as sponge, the blast media are ejected to the coated surface by high pressure air, grind the coated surface and roughen the surface.

According to the blasting technique, when the blast media collide against the coated surface, the blast media become flat, and the abrasives contained therein directly collide against the coated surface at a high speed. Thereby, as in a sand blasting technique, the coated surface can be ground by the abrasives. Dust particles which usually float in the air are taken into the porous elastic bodies and directly drop, and therefore, scattering of dust particles can be prevented. Since the repulsive force is absorbed by the porous elastic bodies, rebound does not occur, and therefore, equipment of a worker can be light.

According to the blasting apparatus and blasting method of the present invention, the ejection device of the blast media, the recovery device of the blast media and the roughness measuring device are mounted on the traveling carriage which travels and moves on the surface to be treated, then the traveling carriage is caused to travel automatically, and while the blast media are ejected to the surface to be treated from the ejection device, and the used blast media are sucked and recovered by the recovery device, the roughness of the uneven surface of the surface to be treated which is treated by ejection of the blast media is measured by the roughness measuring device. Then, a feedback control of the ejection amount of the blast media, the ejection pressure, the ejection speed, the ejection air amount, the suction air amount by the above described recovery device, and the speed of the above described traveling carriage is performed so that the measured roughness is within the range of the predetermined roughness, and therefore, in the blasting operation of the surface to be treated of which roughness is specified, standardization and automation can be achieved.

DETAILED DESCRIPTION OF THE PREFERRED EMBODIMENTS

A preferred embodiment of a blasting apparatus and a blasting method according to the present invention will now be described in detail with reference to the accompanying drawings.

Figure 1:
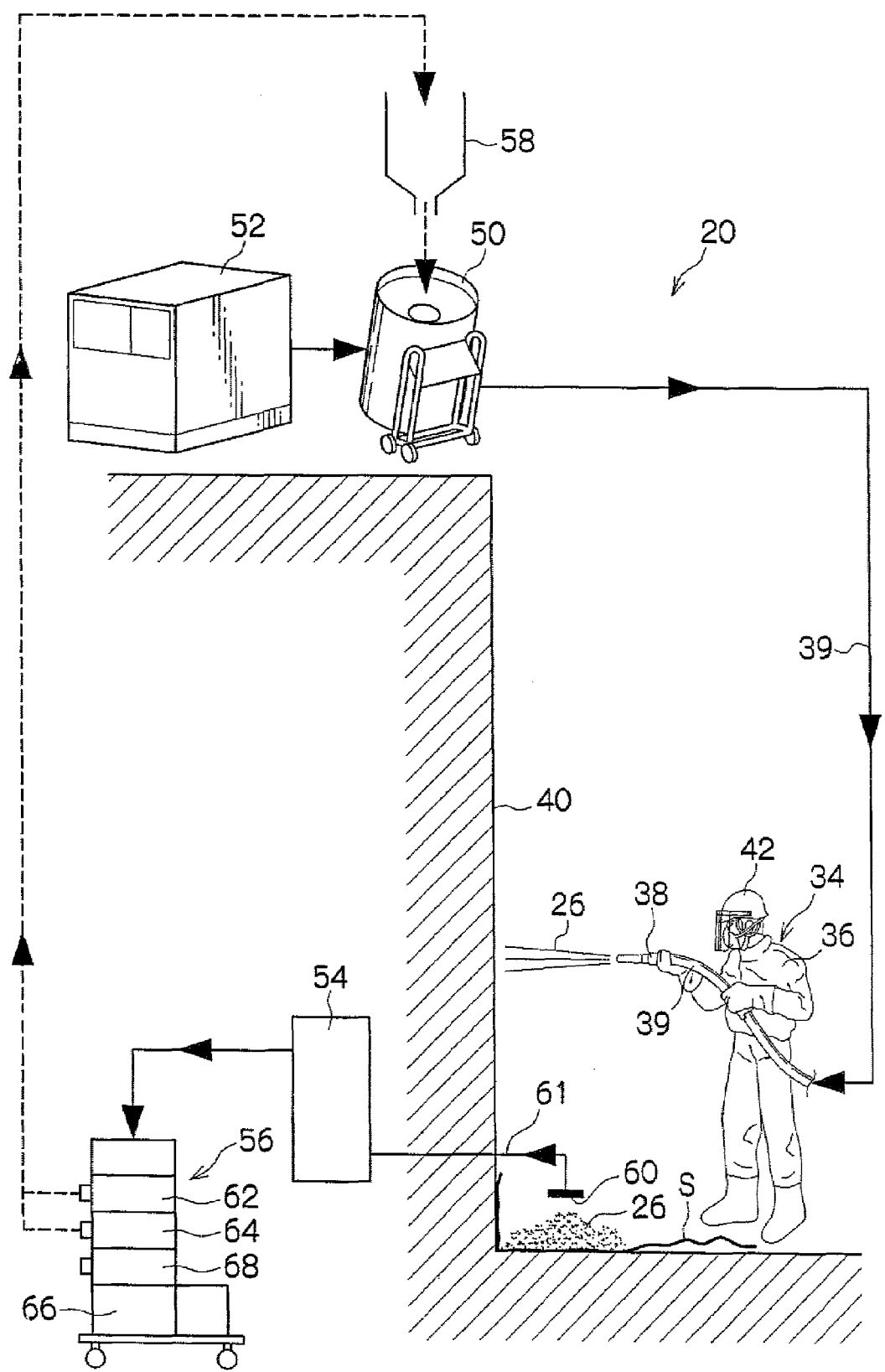
FIG. 1 is a general schematic diagram of a sponge blasting apparatus.

FIG. 1 is an explanatory view showing a basic structure of a sponge-shaped porous elastic body blasting apparatus (hereinafter, called a sponge blasting apparatus) 20.

Figure 2A:
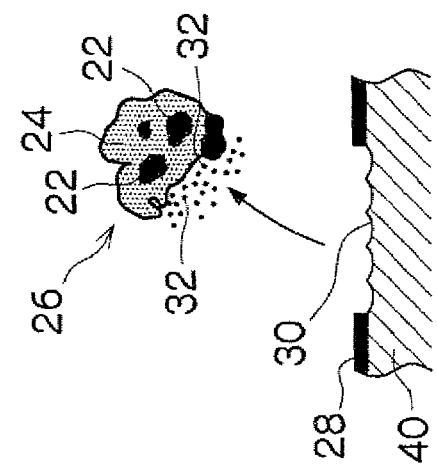
FIGS. 2A to 2C are views explaining a mechanism of the sponge blasting.
Figure 2B:
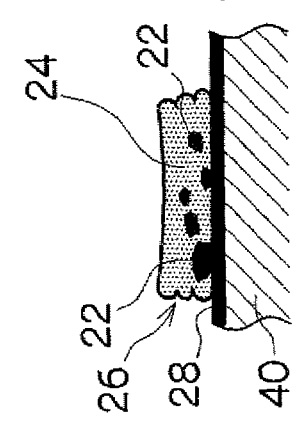
Figure 2C:
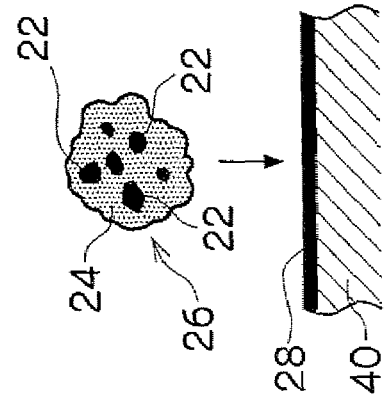

Explaining a sponge blasting technique using the sponge blasting apparatus 20 first, a blast medium 26 used in this technique is made by sticking abrasives (also called a grinding material in the case of a urea resin) of a different material (steel grit, alumina, star light, a urea resin and the like) in accordance with the roughness (arithmetic average roughness, maximum height, ten point height of irregularities), which is required of a coated surface 30, to a sponge piece 24 as shown in FIGS. 2A to 2C. In this technique, the blast media 26 are ejected to a coating film 28 on a wall 40 by high pressure air, grind the coating film 28 and roughen the coated surface 30 to perform surface preparation.

According to the sponge blasting technique, when the blast media 26 collide against the coating film 28 as shown in FIG. 2A, the blast media 26 become flat as shown in FIG. 2B, and the abrasives 22, 22 contained therein directly collide against the coating film 28 at a high speed. Thereby, as in the sand blasting technique, the coating film 28 can be ground as in FIG. 2C. Dust particles 32, 32, which usually float in the air, are taken into the sponge pieces 24 and directly drop, and therefore, scattering of dust particles can be prevented. Further, the repulsive force is also absorbed by the sponge pieces 24, and therefore, there is less rebound of the blast media 26.

Figure 3:
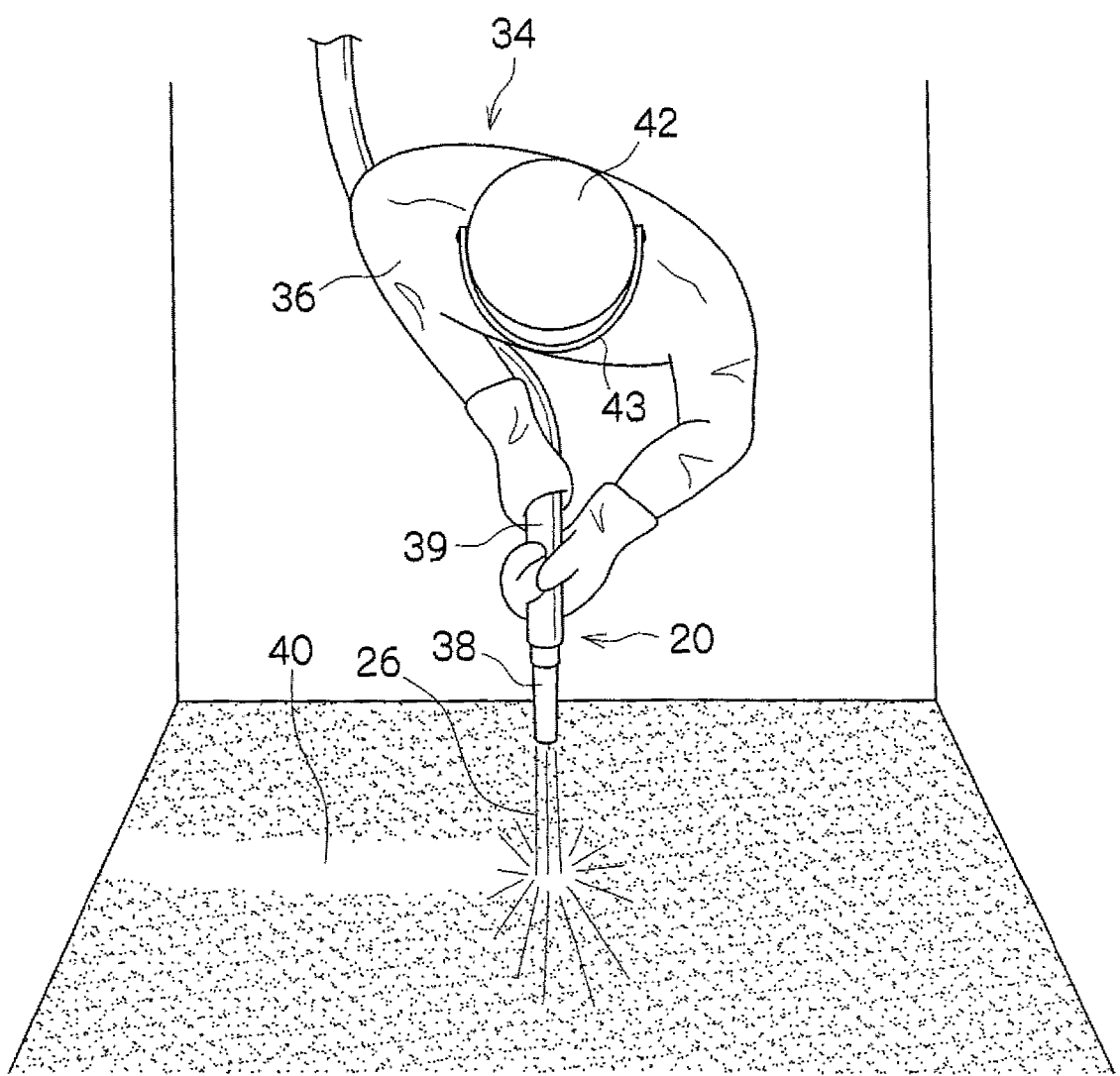
FIG. 3 is a view explaining equipment of a worker of the sponge blasting.

Therefore, equipment 36 of a worker 34 who operates the sponge blasting apparatus 20 can be light as shown in FIG. 3. FIG. 3 shows a view of the worker 34 holding a hose 39 in the vicinity of a nozzle 38 of the sponge blasting apparatus 20 with both hands, and ejecting the blast media 26 to the wall 40. The worker 34 does not have to equip his or her entire body with a protector as in a sand blasting technique, and as for a helmet 42, an ordinary helmet used in a working site with a face protector 43 formed of a transparent acrylic sheet mounted thereon is used instead of a full-face type helmet which covers all the head portion and the face portion, and the equipment 36 is made extremely light. Thereby, the weight of the equipment is light, and therefore, labor of the worker 34 can be significantly reduced.

The sponge blasting apparatus 20 is constructed by a sponge blast supply device 50, a compressor 52, a nozzle 38, a recovery device 54, a recycle separator 56 and a hopper 58, as shown in FIG. 1.

High pressure air is supplied from the compressor 52 and blast media 26 (see FIG. 2A) is supplied from the hopper 58 to the sponge blast supply device 50. The blast media 26 are ejected to the wall 40 at a high speed from a tip end of the nozzle 38 by being transported by air via the hose 39 by the high pressure air from the compressor 52. The blast media 26 used for grinding directly drop onto a sheet S in a state in which dust particles 32, 32 (see FIG. 2C) are taken therein, are sucked into the recovery device 54 through a hose 61 from a suction port 60 of the recovery device 54, and fed into the recycle separator 56.

The recycle separator 56 is constructed by stacking two sieves 62, 64, which respectively have sieve openings of large and medium sizes, in layer on a vibration generator 66. The blast media 26 are first fed into the sieve 62 with the large sieve openings, and the sieve 62 is vibrated by the vibrator of the vibration generator 66, whereby the large-sized blast media 26 are separated and taken out from the sieve 62. The blast media 26 which pass through the sieve 62 drop into the sieve 64, and the medium-sized blast media 26 are separated and taken out by the sieve 64 which is similarly vibrated by the vibrator. The large-and medium-sized blast media 26 removed from the sieves 62 and 64 can be used as they are, and therefore, they are conveyed to the hopper 58. Fine blast media 26 which pass through the sieve 64 are not reusable, and therefore, stored in a container 68 and discarded. Reusable blast media 26 constitute about 90% of the entire blast media 26. The above is the basic structure of the sponge blasting apparatus 20.

Figure 4:
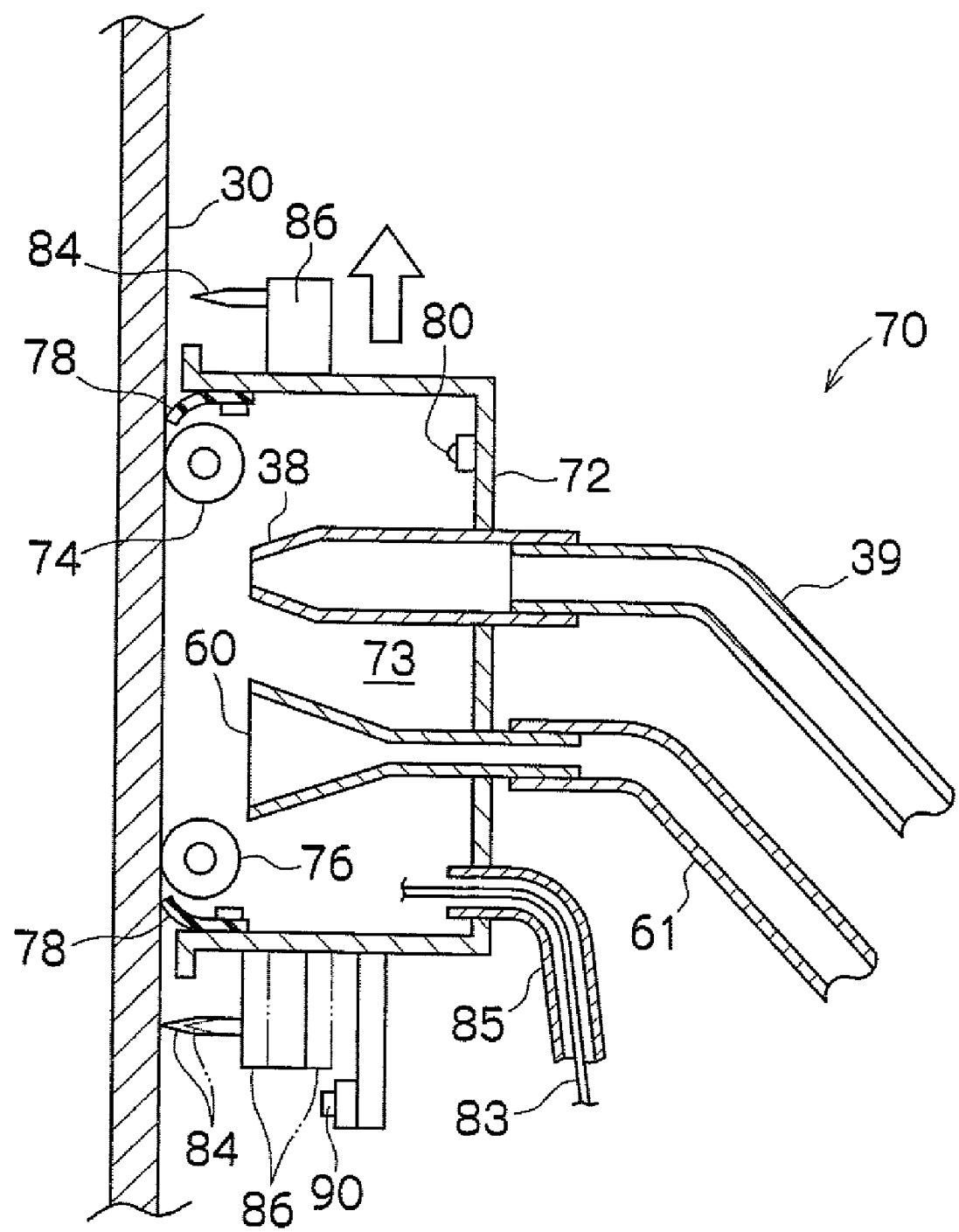
FIG. 4 is a sectional view of a blasting apparatus of an embodiment.

FIG. 4 is a sectional view of a blasting apparatus 70 according to an embodiment, the same or similar members as in the sponge blasting apparatus 20 shown in FIG. 1 to FIG. 3 are described by assigning them with the same reference numerals.

An apparatus body 72 of the blasting apparatus 70 is a traveling carriage including a front wheel 74 and a rear wheel 76 of a permanent magnet, and by magnetically attaching the front wheel 74 and the rear wheel 76 to the coated surface 30 of a steel plate, the apparatus body 72 is mounted to be capable of traveling and moving along the coated surface 30. In the embodiment, the front wheel 74 and the rear wheel 76 are made of the permanent magnet, but they may be of an electromagnet.

Further, rubber seal members 78 are fixed to opening end portions of the apparatus body 72, and the seal members 78 are caused to abut on the coated surface 30 with elasticity, whereby the internal space 73 of the apparatus body 72 is sealed. Thereby, the blast media 26 ejected in the internal space 73 is prevented from leaking out of the apparatus body 72.

Figure 5:
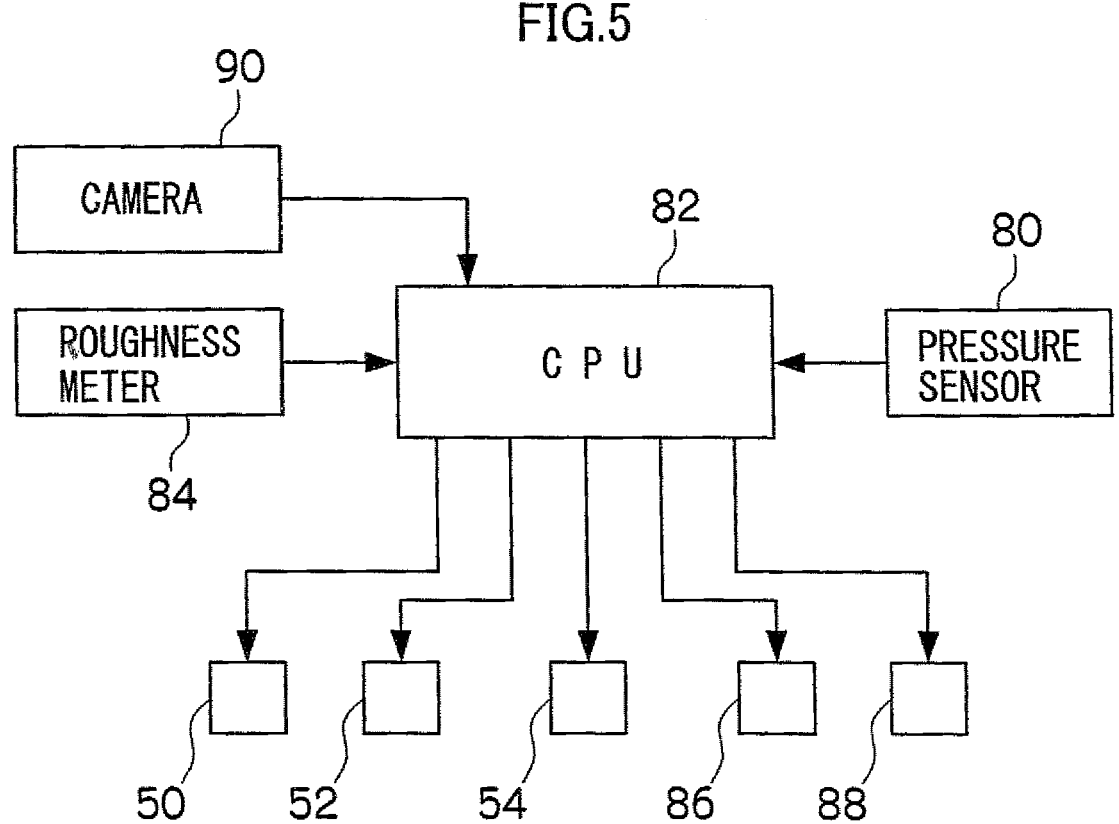
FIG. 5 is a block diagram showing a construction of the blasting apparatus shown in FIG. 4.

Further, a pressure sensor 80 which detects internal pressure of the internal space 73 is mounted to the apparatus body 72, and the information indicating the pressure detected by the pressure sensor 80 is outputted to a CPU (control unit) 82 shown in FIG. 5. The CPU 82 is a central processing unit which has a centralized control over the entire blasting apparatus 70 such as the sponge blast supply device 50, the compressor 52, the recovery device 54 and the like. The CPU 82 will be described later.

As shown in FIG. 4, the apparatus body 72 is provided with the nozzle 38 and the suction port 60 to penetrate through the internal space 73. When the apparatus body 72 is magnetically attached to the coated surface 30, the nozzle 38 and the suction port 60 are opposed to the coated surface 30, and the blast media 26 are ejected to the coated surface 30 from the nozzle 38 while the used blast media 26 which collide against the coated surface 30 are sucked and recovered from the suction port 60.

Probe type roughness meters (roughness measuring devices) 84 and 84 which measure the roughness of the uneven surface of the coated surface 30 which is ground by ejection of the blast media 26 are provided at a front portion and a rear portion of the apparatus body 72. The information indicating the roughness measured by the roughness meter 84 is outputted to the CPU 82 shown in FIG. 5. When the apparatus body 72 is moved upward, the information indicating roughness measured by the roughness meter 84 at the rear portion is outputted to the CPU 82, and when the apparatus body 72 is moved downward, the information indicating the roughness measured by the roughness meter 84 at the front portion is outputted to the CPU 82. In the embodiment, an example of the probe (contact) type roughness meter 84 is shown, but the roughness meter is not limited to this, and a non-contact type roughness meter may be applied.

The roughness meters 84 and 84 are provided at the apparatus body 72 via advancing and retreating devices 86 and 86 as shown in FIG. 4, and only at the time of measurement, they are advanced toward the coated surface 30 and brought into contact with the coated surface 30. The advancing and retreating devices 86 and 86 are also controlled by the CPU 82, and a motor 88 (not shown in FIG. 4, shown in FIG. 5) which drives the front wheel 74 and/or the rear wheel 76 is also remotely controlled by the CPU 82. The advancing and retreating devices 86 and 86 and the motor 88 are supplied with power from a cable 83 shown in FIG. 4, and the cable 83 is inserted into the hose 85 connected to the apparatus body 72. The cable 83 may be placed along the hoses 39 and 61 without using the hose 85.

Meanwhile, the apparatus body 72 is provided with an electronic camera 90 which picks up an image of the coated surface 30 ground by ejection of the blast media 26. The image data of the coated surface 30 picked up by the electronic camera 90 is outputted to the CPU 82 in FIG. 5. The CPU 82 compares the image obtained by the electronic camera 90 and a reference image (sample image) previously stored, and determines the rust removal degree of the coated surface 30 and the pattern of the stripped plane (anchor pattern).

Next, an operation of the blasting apparatus 70 constructed as above will be described.

First, the apparatus body 72 on which the nozzle 38, the suction port 60, the pressure sensor 80, the roughness meters 84 and the electronic camera 90 are mounted is magnetically attached to the coated surface 30 via the front wheel 74 and the rear wheel 76 of the permanent magnet.

Next, by driving the front wheel 74 and/or the rear wheel 76 by the motor 88, the apparatus body 72 is caused to travel upward automatically, and while the blast media 26 are ejected to the coated surface 30 from the nozzle 38 and the used blast media 26 are sucked and recovered by the suction port 60, roughness (arithmetic average roughness, maximum height, ten point height of irregularities) of the uneven surface of the coated surface 30 ground by the ejection of the blast media 26 is measured by the roughness meter 84.

The CPU 82 controls at least one of the sponge blasting supply device 50, the compressor 52, the recovery device 54 and the motor 88 so that the measured roughness is within a range of predetermined roughness corresponding to the coating, and performs a feedback control of at least one of an ejection amount of the blast media 26, ejection pressure, ejection speed, an ejection air amount, a suction air amount, and speed of the apparatus body 72.

Thereby, according to the blasting apparatus 70 of the embodiment, in the blasting operation of the coated surface 30 of which roughness is specified, standardization and automation can be achieved.

The various conditions to make the predetermined roughness obtained by the above described feedback control are stored in a storage part of the CPU 82. The various conditions are read from the storage part and used at the next time when the next same conditions are used. Thereby, at the time of the next operation, the coated surface 30 can be treated to have predetermined roughness from the beginning without performing a feedback control.

Further, the CPU 82 compares the coated surface image after a blast operation which is picked up by the electronic camera 90 of the apparatus body 72, and the reference image (sample image) previously stored, and the rust removal degree of the coated surface 30 specified by ISO and the anchor pattern are determined. The rust removal degree and the anchor pattern are determined by comparing gradations of the images, for example. Therefore, according to the blasting apparatus 70 of the embodiment, the blasting operation of the coated surface 30, and the rust removal degree determining operation and/or the anchor pattern determining operation can be simultaneously performed. The determination result by the CPU 82 may be outputted from a printer or may be displayed on a display.

Since the blasting apparatus 70 is for performing a blasting operation while moving on the coated surface 30 up and down, an over blast phenomenon in which portions which overlap the adjacent coated surface are ground more than the other portions sometimes occurs, and distribution sometimes occurs to roughness. In order to prevent this problem, in the blasting apparatus 70 of the embodiment, the number of blast media 26 which are ejected to the overlapping portions is made smaller than that of the blast media 26 ejected to the central portion, and adjustment is made so that the same amount is blasted to each portion as a result.

After the blasting apparatus 70 moves upward, when the blasting apparatus is to move downward, the front wheel 74 and/or the rear wheel 76 which are magnetically attached are or is operated with a handle (not shown), and the overlapping regions of the coated surface 30 last surface) to be ground can be made as small as possible.

In the embodiment, the sponge blast medium 26 in which abrasives are contained in the porous elastic body is described as the blast medium, but the blast medium is not limited to this, and may be a sand blast medium.

What is claimed is:

1. A blasting apparatus which is provided with an ejection device, which ejects blast media, and a recovery device, which sucks and recovers ejected and used blast media, on a traveling carriage, ejects the blast media to a surface to be treated by the ejection device while causing the traveling carriage to travel on the surface to be treated, and recovers the used blast media by the recovery device, and comprising:
    a roughness measuring device that is provided at the traveling carriage and measures roughness of an uneven surface of the surface to be treated which is treated by ejection of the blast media; and
    a control unit which performs a feedback control of an ejection amount of the blast media, ejection pressure, ejection speed, an ejection air amount, a suction air amount by the recovery device, and a speed of the traveling carriage so that the roughness which is measured by the roughness measuring device is within a range of predetermined roughness.

2. The blasting apparatus according to claim 1, further comprising:
    an image pickup device which is provided at the traveling carriage and picks up an image of the surface to be treated which is treated by ejection of the blast media,
    wherein the control unit compares an image obtained by the image pickup device and a reference image which is previously stored, and determines a rust removal degree of the surface to be treated and/or an anchor pattern.

3. The blasting apparatus according to claim 1, wherein the blast medium is a blast medium in which abrasives are contained in a porous elastic body.

4. The blasting apparatus according to claim 2, wherein the blast medium is a blast medium in which abrasives are contained in a porous elastic body.

5. A blasting method in which an ejection device which ejects blast media, and a recovery device which sucks and recovers ejected and used blast media are provided on a traveling carriage, the blast media is ejected to a surface to be treated by the ejection device while causing the traveling carriage to travel on the surface to be treated, and the used blast media are recovered by the recovery device, comprising the steps of:
    measuring roughness of an uneven surface of the surface to be treated which is treated by ejection of the blast media; and
    performing a feedback control of an ejection amount of the blast media, ejection pressure, ejection speed, an ejection air amount, a suction air amount by the recovery device, and a speed of the traveling carriage so that the roughness which is measured is within a range of predetermined roughness.

6. The blasting method according to claim 5, further comprising the step of:
    determining the rust removal degree of the surface to be treated and/or an anchor pattern by picking up an image of the surface to be treated which is treated by ejection of the blast media and comparing the image with the reference image.

7. The blasting method according to claim 5, wherein the blast medium is a blast medium in which abrasives are contained in a porous elastic body.

8. The blasting method according to claim 6, wherein the blast medium is a blast medium in which abrasives are contained in a porous elastic body.

* * * * *